United States Patent
Lopez

(10) Patent No.: US 10,182,636 B2
(45) Date of Patent: Jan. 22, 2019

(54) EZ MIRROR

(71) Applicant: Samuel Lopez, Visalia, CA (US)

(72) Inventor: Samuel Lopez, Visalia, CA (US)

( * ) Notice: Subject to any disclaimer, the term of this patent is extended or adjusted under 35 U.S.C. 154(b) by 0 days.

(21) Appl. No.: 15/498,357

(22) Filed: Apr. 26, 2017

(65) Prior Publication Data

US 2017/0303667 A1    Oct. 26, 2017

Related U.S. Application Data

(60) Provisional application No. 62/327,933, filed on Apr. 26, 2016.

(51) Int. Cl.
| | |
|---|---|
| *G02B 7/182* | (2006.01) |
| *A45D 42/12* | (2006.01) |
| *G02B 5/09* | (2006.01) |
| *A45D 42/18* | (2006.01) |
| *A45D 42/10* | (2006.01) |
| *A45F 3/14* | (2006.01) |
| *G02B 7/00* | (2006.01) |

(52) U.S. Cl.
CPC .............. *A45D 42/12* (2013.01); *A45D 42/10* (2013.01); *A45D 42/18* (2013.01); *A45F 3/14* (2013.01); *G02B 5/09* (2013.01); *G02B 7/002* (2013.01); *G02B 7/182* (2013.01); *A45F 2003/146* (2013.01)

(58) Field of Classification Search
CPC ........ A45D 42/10; A45D 42/12; A45D 42/18; G02B 7/002; G02B 7/182
USPC ....................................... 359/854, 879, 880
See application file for complete search history.

(56) References Cited

U.S. PATENT DOCUMENTS

| | | | | |
|---|---|---|---|---|
| 699,901 | A | * | 5/1902 | Svendsgaard ........... B60R 1/081 359/855 |
| 1,001,759 | A | * | 8/1911 | Hoogner ................... B60R 1/12 224/247 |
| 1,121,585 | A | * | 12/1914 | Hirsch .................... A45D 42/10 362/144 |
| 1,130,689 | A | * | 3/1915 | Atkinson ................... B60R 1/12 108/43 |
| 1,179,063 | A | * | 4/1916 | Aldrete ...................... B60R 1/12 224/265 |
| 1,338,582 | A | * | 4/1920 | Morris ...................... A47C 7/62 160/127 |
| 1,907,314 | A | * | 5/1933 | Baer ................... G02B 23/2476 359/881 |
| 2,286,851 | A | * | 6/1942 | Hess ....................... F21S 6/003 362/277 |

(Continued)

*Primary Examiner* — Ricky D Shafer
(74) *Attorney, Agent, or Firm* — Matthew C. McCartney; Eastman McCartney Dallmann LLP

(57) ABSTRACT

The EZ Mirror has a mirror system connected to a mirror vest by way of a flexible conduit. The mirror system has a central mirror between a left mirror and a right mirror. The left mirror is connected to the central mirror at a left mirror angle and the right mirror is connected to the central mirror at a right mirror angle. In use, the mirror system is held in place behind a user's head by the flexible conduit and mirror vest worn by a user, enabling the user to use both hands while looking into the mirror system of the EZ Mirror when engaged in activities such as cutting or braiding one's hair. The EZ Mirror allows a full view of the sides and back of a user's head without having to move any mirror in the mirror system.

4 Claims, 14 Drawing Sheets

(56) References Cited

U.S. PATENT DOCUMENTS

| | | | | |
|---|---|---|---|---|
| 2,598,291 | A * | 5/1952 | O'Brien | A45D 42/12 |
| | | | | 359/854 |
| 4,707,087 | A * | 11/1987 | Van Zandt | A45D 42/12 |
| | | | | 359/880 |
| 5,651,711 | A * | 7/1997 | Samano | B63C 9/20 |
| | | | | 116/173 |
| 5,777,808 | A * | 7/1998 | Rashad | A45D 42/18 |
| | | | | 359/855 |
| 6,099,133 | A * | 8/2000 | Wright | A45D 42/12 |
| | | | | 359/879 |
| 6,126,289 | A * | 10/2000 | Nagayama | B60R 1/081 |
| | | | | 359/854 |
| 6,347,876 | B1 * | 2/2002 | Burton | A45D 42/10 |
| | | | | 362/141 |
| 2013/0143723 | A1 * | 6/2013 | Bender | A63B 21/0552 |
| | | | | 482/121 |

* cited by examiner

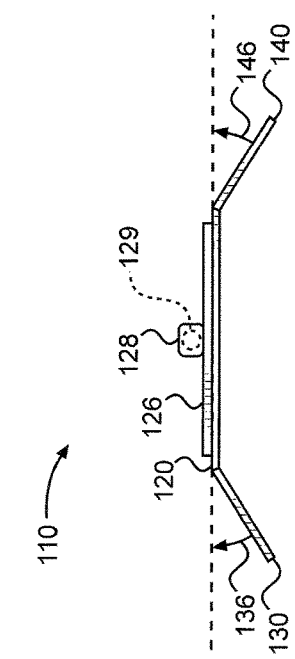
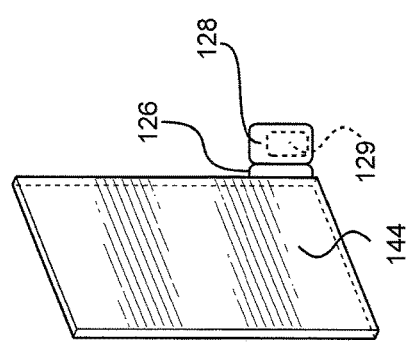
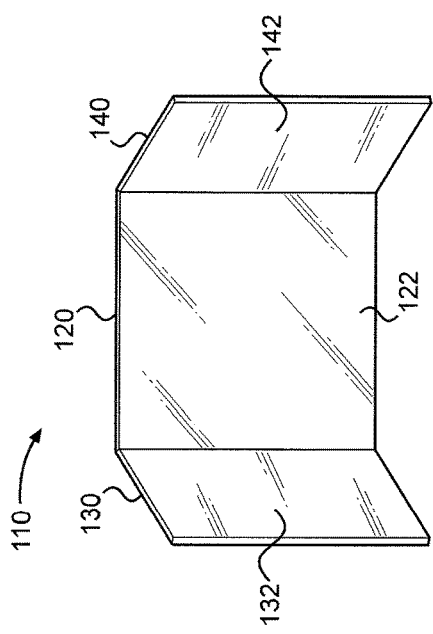
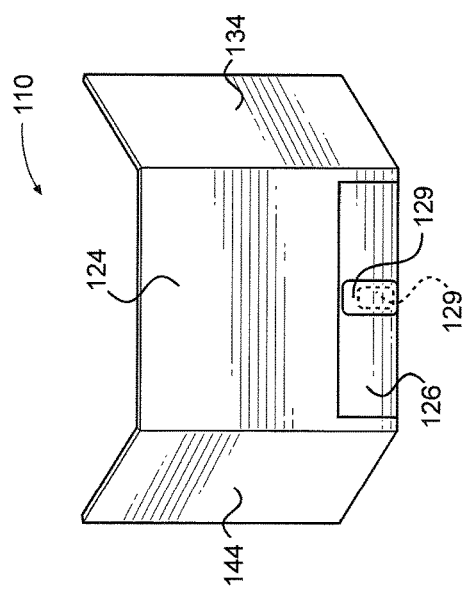

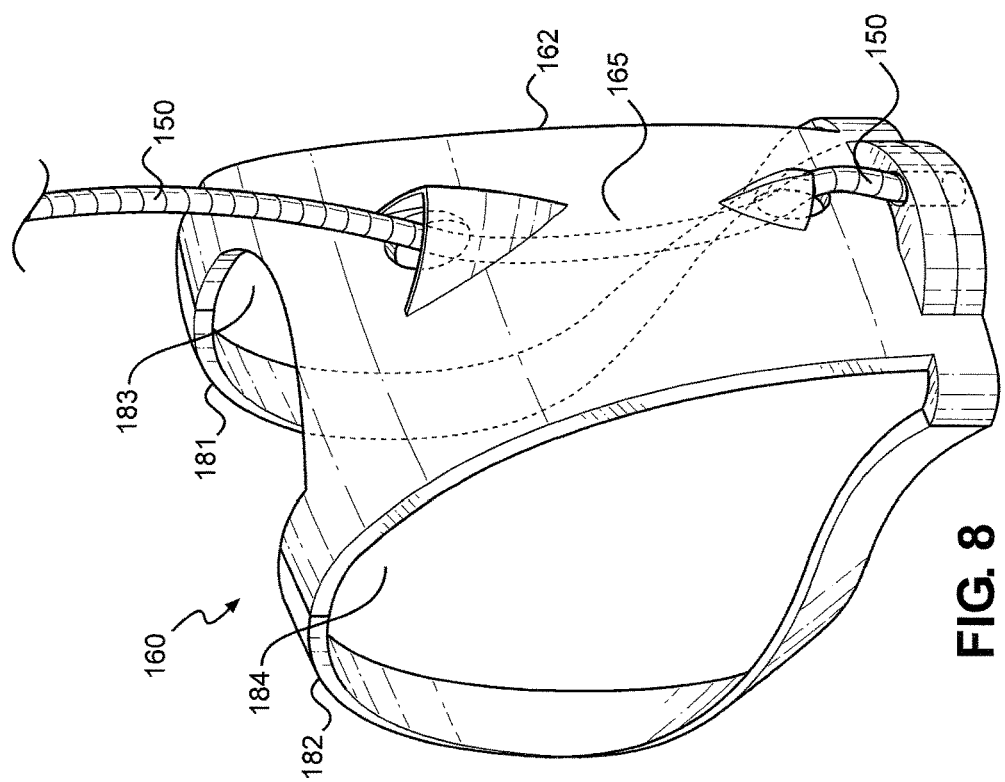
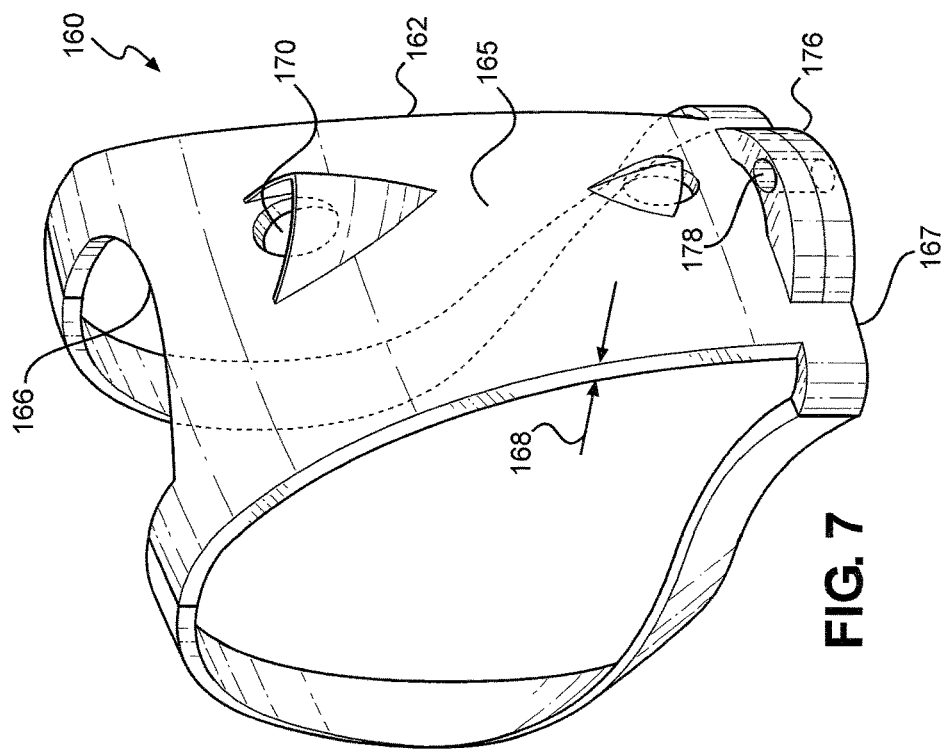

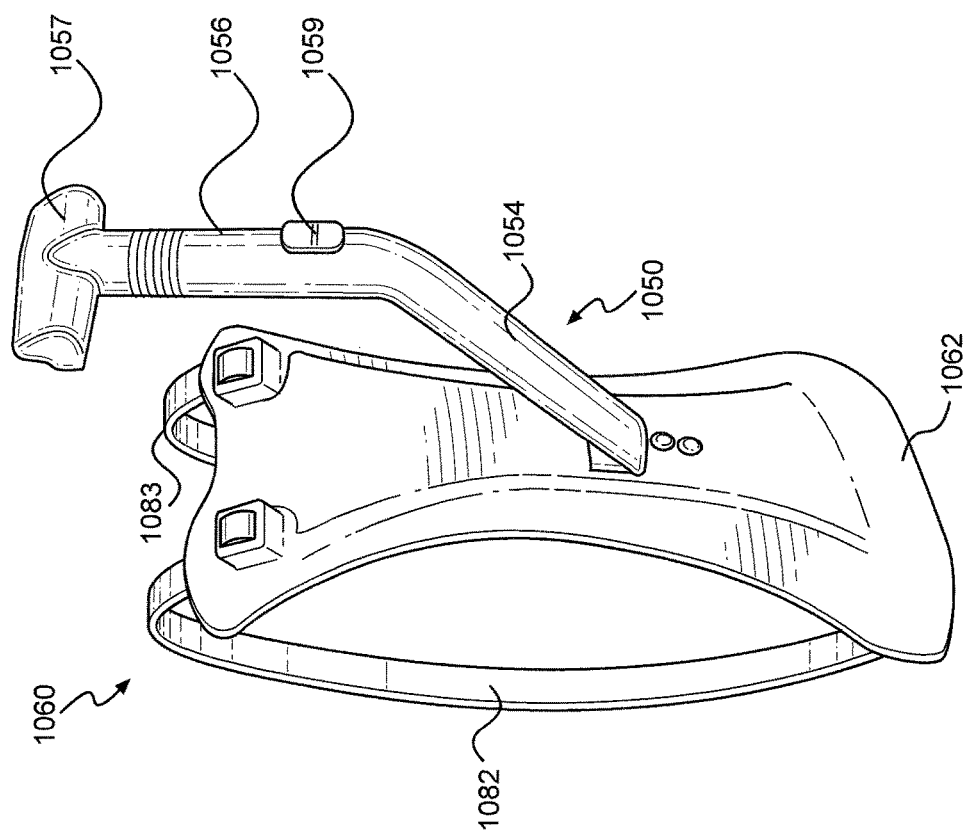

EZ MIRROR

RELATED APPLICATION

This application claims the benefit of priority to U.S. Provisional Application Ser. No. 62/327,933 for "EZ Mirror," filed on Apr. 26, 2016.

FIELD OF THE INVENTION

The present invention pertains generally to a mirror vest that can be worn by a user. More specifically, the present invention pertains to a three sided mirror that is connected to a vest via a flexible conduit. The present invention is particularly, though not exclusively, useful for enabling a user to use the three sided mirror without using any hands, and thus further enabling the user to engage in two handed activities, such as cutting or braiding hair.

BACKGROUND

Conventional hand held mirrors are difficult to use and typically take at least one hand to hold in place. Moreover, it is difficult to see the back of one's head while using a conventional handheld mirror, even when used in combination with a second mirror, such as a bathroom vanity mirror. Persons wanting to see the back of their head from multiple angles are left consistently having to switch the mirror from their left hand to their right hand. Some tasks, like braiding hair, require the use of two hands. Other tasks, such as cutting hair, are much easier to do when using two hands. Whenever a task requires the use of two hands with a view of the back of one's head, a conventional mirror does not complete the task. Although "hands free" mirrors are known in the art, the conventional hands free mirrors either have to be attached to a rigid body, such as a wall, or are simply wrapped around a user's neck with a simple chord. These conventional hands free mirrors are inconvenient and when worn are ergonomically uncomfortable. Moreover, conventional "hands free" worn mirrors are often unstable and also cannot afford a full view of the sides and back of one's head when worn.

Therefore, there is a need for a device that enables a user to utilize a mirror without engaging his or her hands that is comfortable to wear and stable when worn. There is further need for a device that enables a user to use the mirror to see the sides and back of his or her head when engaged in an activity such as braiding or cutting one's hair without risk of the mirror moving when the user is engaged in such activity.

SUMMARY OF THE INVENTION

The present invention is directed to an EZ Mirror. The EZ Mirror satisfies the needs to have a comfortable and stable portable mirror that can be held in place without the need for a user to use his or her hands. The EZ Mirror also enables the user to see the sides and back of his or her head when using the EZ Mirror enabling the user to use both hands for other activities, such as braiding and cutting his or her own hair without the need for help from a second person.

In a preferred embodiment, the components of the EZ Mirror include a mirror system connected to a mirror vest via a flexible conduit. The EZ Mirror has a mirror system with at least one mirror connected to one end of a conduit, with the other end of the conduit attached to some form of a harness to be worn by a user. The harness, when worn by a user, in combination with the conduit, enables the user to hold the mirror system at a strategic location behind the user's head without the use of his or her hands.

In an alternative preferred embodiment, the mirror system is comprised of three mirror panels; a central mirror panel in between a left mirror panel and a right mirror panel. The left mirror panel is connected at a left mirror angle with respect to the central mirror. Similarly, the right mirror panel is connected at a right mirror angle with respect to the central mirror. The left mirror angle and the right mirror angle facilitate a more complete view of the reflected image of the user's side and back of head. In use, the mirror system having a left mirror panel, right mirror panel and central panel is positioned such that the user's head is approximately centered on the central panel.

Each mirror panel in the mirror system has a mirror surface panel opposite a mirror rear panel. Each mirror surface panel is comprised of one or more plastic materials well known in the art for use in the manufacture of mirrors, such as acrylic or polycarbonate. Alternative materials for the mirror surface panels include tempered glass and metallic alloys. Each mirror rear panel is made from any rigid material, such as hard plastic. The mirror rear panel is mounted opposite a respective mirror surface panel and reinforces the mirror surface panel, which can often be flexible. The rigidity of the mirror rear panel prevents movement of the respective mirror surface panel to prevent a distorted mirror image. Alternative materials for the mirror rear panels include metal and carbon fiber. It is to be noted that Applicant's invention would include an embodiment of simply a mirror panel with a reflective mirror surface, rather than a mirror panel comprised of both a mirror surface panel and a mirror rear panel. However, as noted above, the addition of a mirror rear panel is useful to add rigidity to the mirror system to prevent image distortion.

Additional rigidity can be supplied to the each of the mirror panels in the mirror system through the addition of a mirror support panel mounted to the rear mirror panel of each mirror panel in the mirror system. A conduit housing is mounted to a mirror panel in the mirror system of the EZ Mirror. The conduit housing can be connected directly onto a mirror rear panel or connected onto a mirror support panel. The conduit housing has a conduit aperture sized to receive a first end of a conduit.

The conduit can be made of any materials known in the art, but in a preferred embodiment the conduit should be both flexible and sufficiently strong to bear the weight of the mirror system without movement once flexed into proper position. The length of the conduit is sufficiently long to allow adjustment to address different heights and thicknesses of various users. The first end of the flexible conduit is removably inserted into the conduit housing in order to connect the mirror system to the flexible conduit. The second end of the flexible conduit is connected to a harness worn by the user as set forth more fully below.

Flexible conduits are well known in the art and can be made of a variety of materials including plastics, metals and various alloys. In a preferred embodiment, the conduit is hollow to reduce weight but maintain sufficient strength to bear the weight of the mirror system yet allow for manual configuration by a particular user. Alternatively, the conduit can be comprised of flexible wire coated in a soft material such as polyurethane or other soft plastic coating for aesthetics and comfort.

The second end of the flexible conduit is connected to a harness worn by the user to bear the weight of the mirror system and conduit. In a preferred embodiment, the harness is a mirror vest. The mirror vest has a support panel and at least two straps to allow the user to secure the support panel across the surface of his or her back and support the weight of the mirror system on the shoulders. Such a configuration minimizes tiring by the user while wearing the EZ Mirror invention.

In one embodiment, the support panel has a first conduit aperture and a second conduit aperture separated by a conduit channel. The second end of the flexible conduit is passed through the first and second conduit aperture such that a portion of the flexible conduit rests flush in the conduit channel and is prohibited from rotation with respect to the mirror vest by the first and second conduit apertures, thus adding to the stability of the mirror system. Finally, the support panel can be equipped with a vest conduit housing near the bottom of the support panel. The vest conduit housing has a vest conduit aperture sized to receive and secure the second end of the flexible conduit.

In use, the user wears the mirror vest or harness to bear the weight of the mirror system and hold the mirror system in place. The conduit is then adjusted to place the mirror system in the desired position behind the user's head. Once so positioned, the user can see his or her reflection, including the back of the user's head, in the left and right mirror surface panels. Alternatively, the user can utilize a standard fixed mirror, such as a bathroom vanity mirror, in order to see the back of his or her head as reflected by the mirror system.

The user, when wearing the EZ Mirror, is then free to utilize both his or her left hand and right hand to engage in a variety of activities such as cutting or braiding hair.

In an alternative embodiment of the present invention, the left mirror panel and the right mirror panel are each removably attached to the central mirror panel to enable the user to easily disconnect the left mirror panel and the right mirror panel from the central mirror panel. When so disconnected, the left mirror panel, right mirror panel and central mirror panel can more easily be stored when not in use.

In another alternative embodiment of the present invention, the left and right mirror panels are rotatably connected to the central mirror panel via moveable hinges. Any hinge known in the art can be utilized, such as piano hinges that run along the length of the sides of the central panel.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 1 is a front view of the mirror system of the EZ Mirror showing the central mirror panel, the left mirror panel, the right mirror panel and the central mirror surface panel, the left mirror surface panel and the right mirror surface panel respectively;

FIG. 2 is a rear view of the mirror system of the EZ Mirror showing the central mirror rear panel having a central mirror support panel and central mirror conduit housing, the left mirror rear panel and the right mirror panel;

FIG. 3 is a top view of the mirror system of the EZ Mirror showing left mirror panel at a left mirror angle to the central mirror panel and the right mirror panel at a right mirror angle to the central mirror panel where the left mirror angle and the right mirror angle are equal to one another;

FIG. 4 is a right side view of the mirror system of the EZ Mirror showing the central mirror support panel connected to the central mirror rear panel and also showing a central mirror conduit housing connected to the central mirror support panel and having a central mirror conduit aperture;

FIG. 7 is a rear isometric view of the support panel of the mirror vest of the EZ Mirror showing the first conduit aperture within a first conduit aperture housing, a second conduit aperture housing and a vest conduit housing with a vest conduit housing aperture;

FIG. 8 is a rear isometric view of the support panel of the mirror vest of the EZ Mirror showing the flexible conduit passed through the first conduit aperture and the second conduit aperture wherein the second end of the flexible conduit is secured within the vest conduit housing aperture;

FIG. 26 is a rear perspective view of an alternative embodiment of the vest of the EZ Mirror system showing elastic straps and a rigid connector with an angled portion.

DESCRIPTION

Figure 6:
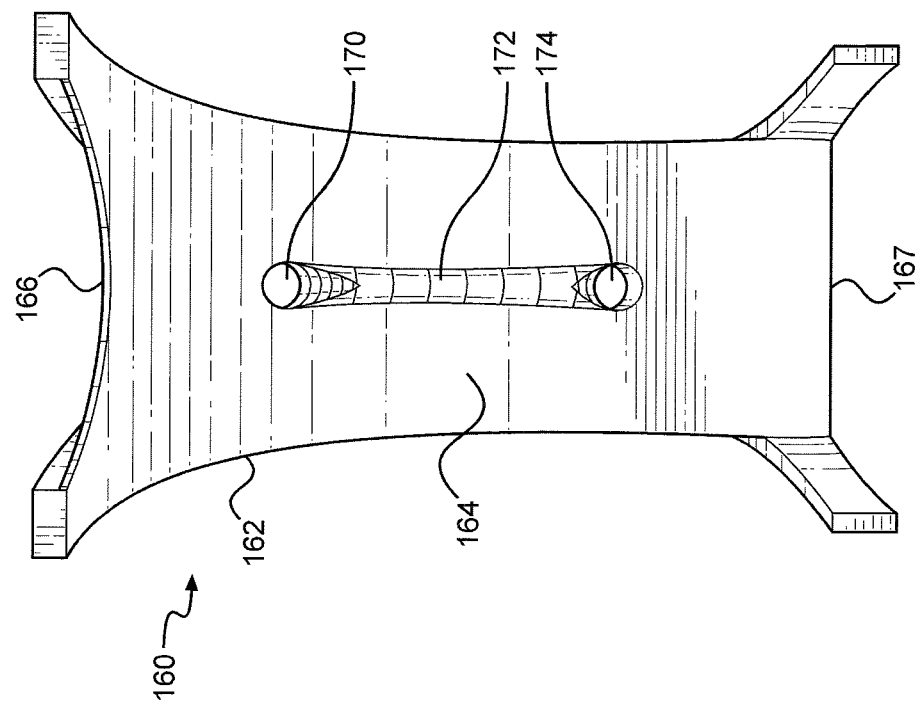
FIG. 6 is a front view of the support panel of the mirror vest of the EZ Mirror showing front of the support panel and showing the first conduit aperture and second conduit aperture with a conduit channel along the surface of the front of the support panel and located between the first conduit aperture and the second conduit aperture.

Referring initially to FIGS. 1 through 4, the mirror system 110 of the present invention is generally shown. The mirror system 110 has a central mirror panel 120, a left mirror panel 130 connected to the left side of the central mirror panel 120 and a right mirror panel 140 connected to the right side of the central mirror panel 120. The left mirror panel 130 is connected to the left side of the central mirror panel 120 at a left mirror angle 136 with respect to the central mirror panel 120. Similarly, the right mirror panel 140 is connected to the right side of the central mirror panel 120 at a right mirror angle 146 with respect to the central mirror panel 120. In an embodiment, the left mirror angle 136 and the right mirror angle 146 are equivalent.

The central mirror panel 120 has a central mirror surface panel 122 opposite a central mirror rear panel 124. In a preferred embodiment, the central mirror surface panel 122 is comprised of one or more plastic materials well known in the art for use in the manufacture of mirrors, such as acrylic or polycarbonate. However, such materials in panel form often can be flexible and lead to a distorted mirror image. To reduce the likelihood of this problem, the central mirror surface panel 122 is connected to and reinforced by the central mirror rear panel 124, which can be made from any rigid hard plastic material.

The left mirror panel 130 has a left mirror panel surface 132 mounted opposite a left rear mirror panel 134 and the right mirror panel 140 has a right mirror panel surface 142 mounted opposite a right rear mirror panel 144. The left mirror panel surface 132 and the right mirror panel surface 142 are each made of acrylic or polycarbonate in a preferred embodiment. The left rear mirror panel 134 and the right rear mirror panel 144 are made from a rigid plastic. The left rear mirror panel 134 and the right rear mirror panel 144 can be opaque and in a variety of colors to improve aesthetics.

Other materials known in the art can be used to construct the central mirror surface panel 122, left mirror surface panel 132 and right mirror surface panel 142, including mirrors made from tempered glass and metallic alloys. Similarly, the central rear mirror panel 124, left rear mirror panel 134 and right rear mirror panel 144 can each be made from other rigid materials known in the art, such as metal or carbon fiber.

The central rear mirror panel 124 can be reinforced with a central mirror support panel 126. A central mirror conduit housing 128 is connected to either the central mirror support panel 126 or the central mirror rear panel 124. The central mirror conduit housing 128 has a central mirror conduit aperture 129. The mirror system 110 is connected to a mirror vest 160 (shown in FIGS. 6 through 11) by way of a flexible conduit 150 (shown in FIG. 5).

Figure 5:
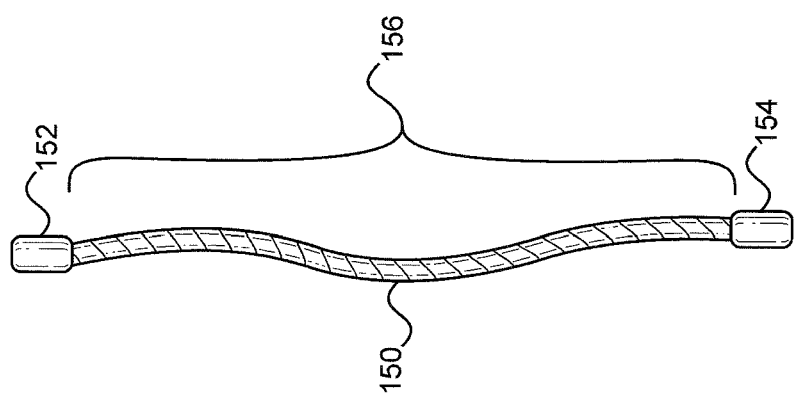
FIG. 5 is a side view of the flexible conduit of the EZ Mirror showing the first end and second end of the flexible conduit having a length.

Turning to FIG. 5, the flexible conduit 150 has a first end 152, a second end 154, and a length 156. The first end 152 of the flexible conduit 150 is sized to fit within the central mirror conduit aperture 129 of the central mirror conduit housing 128. The first end 152 of the flexible conduit 150 can be removably inserted into the central mirror conduit aperture 129 in order to connect the mirror system 110 to the flexible conduit 150. In an alternative embodiment, the length 156 of the flexible conduit 150 can be made adjustable.

Referring next to FIGS. 6-8, the mirror vest 160 has a support panel 162 with a front 164, a back 165, a top 166 and a bottom 167. The front 164 of the support panel 162 is contoured to fit on the back 60 of a user 10 (shown in FIGS. 9-11). Left strap 182 and right strap 181 are connected to the top 166 and bottom 167 of the support panel 162 such that left strap 182 forms a left strap opening 184 and the right strap 181 forms a right strap opening 183.

The support panel 162 has a first conduit aperture 170 near the top 166 of the support panel 162 and a second conduit aperture 174 near the lower middle of the support panel 162. The first conduit aperture 170 and the second conduit aperture 174 are connected by a conduit channel 172 along the front 164 of the support panel 162.

The back 165 of the support panel 162 has a vest conduit housing 176 with a vest conduit housing aperture 178. The vest conduit housing aperture 178 is sized to receive the second end 154 of the flexible conduit 150. To attach the flexible conduit 150 to the mirror vest 160, the second end 154 of the flexible conduit 150 is passed from the back 165 of the support panel 162 to the front 164 of the support panel 162 through the first conduit aperture 170, then passed along the conduit channel 172, then passed from the front 164 of the support panel 162 to the back 165 of the support panel 162 through the second conduit aperture 174, and finally the second end 154 of the flexible conduit 150 is secured within the vest conduit housing aperture 178 of the vest conduit housing 176.

Figure 9:
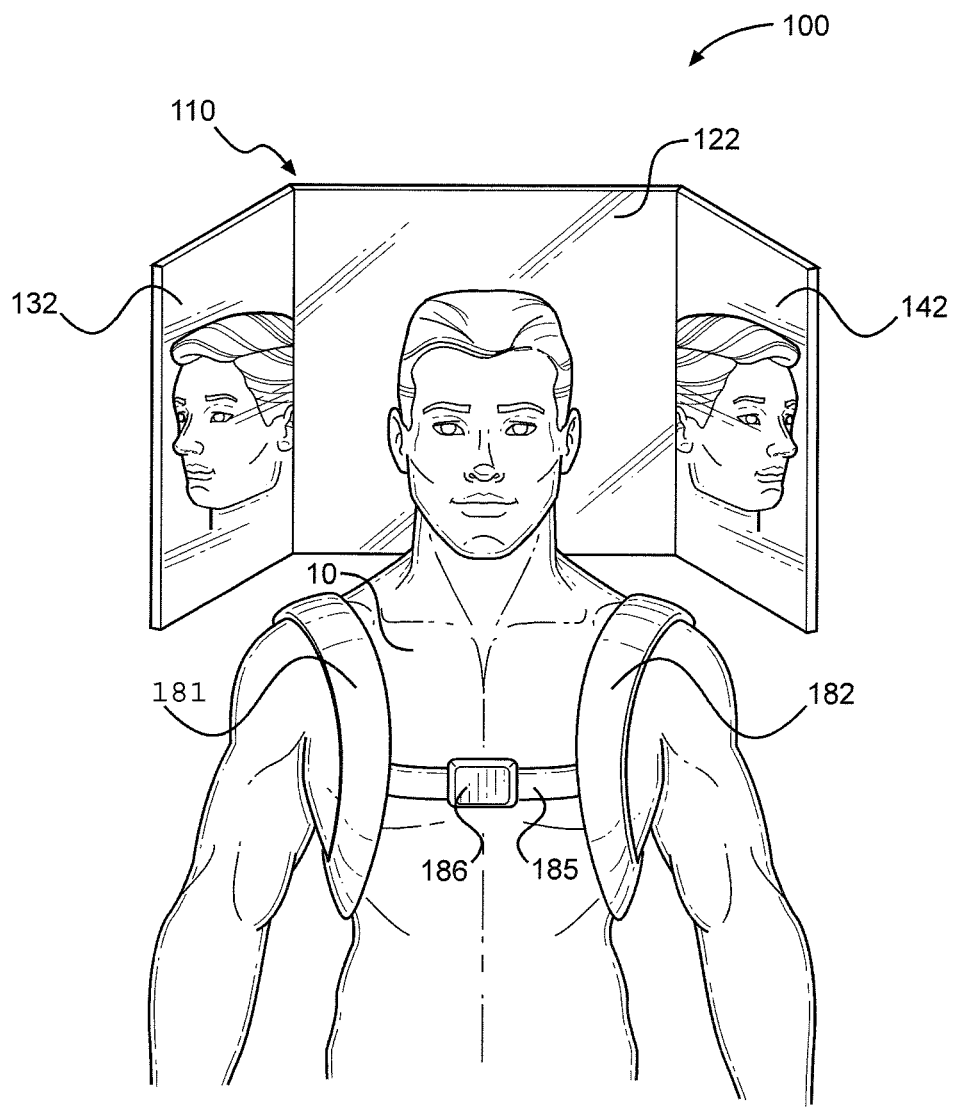
FIG. 9 is a front view of the EZ Mirror in use by a user and showing the mirror image of the user's head on the left mirror surface panel and the right mirror surface panel and showing the mirror vest held in place by left, right and center straps.
Figure 10:
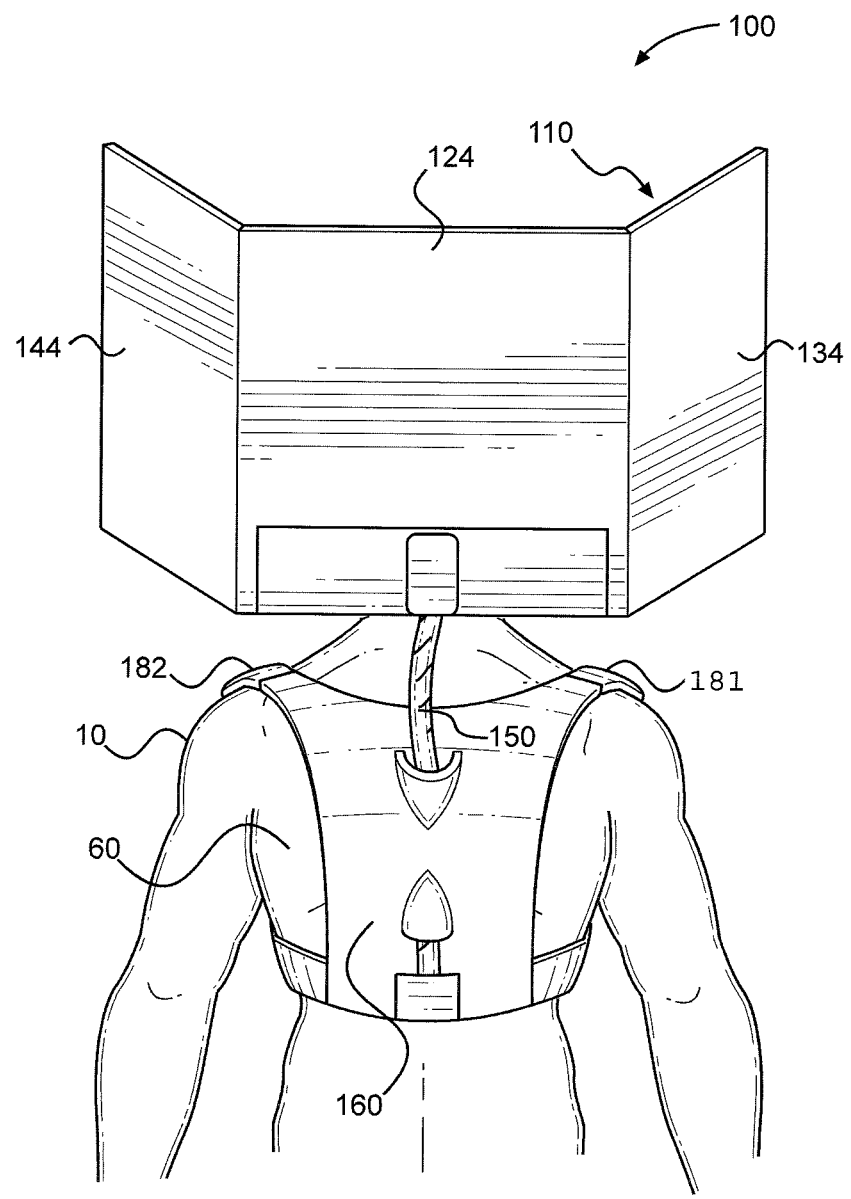
FIG. 10 is a rear view of the EZ Mirror in use by a user and showing the mirror system held in proper position behind the head of the user.
Figure 11:
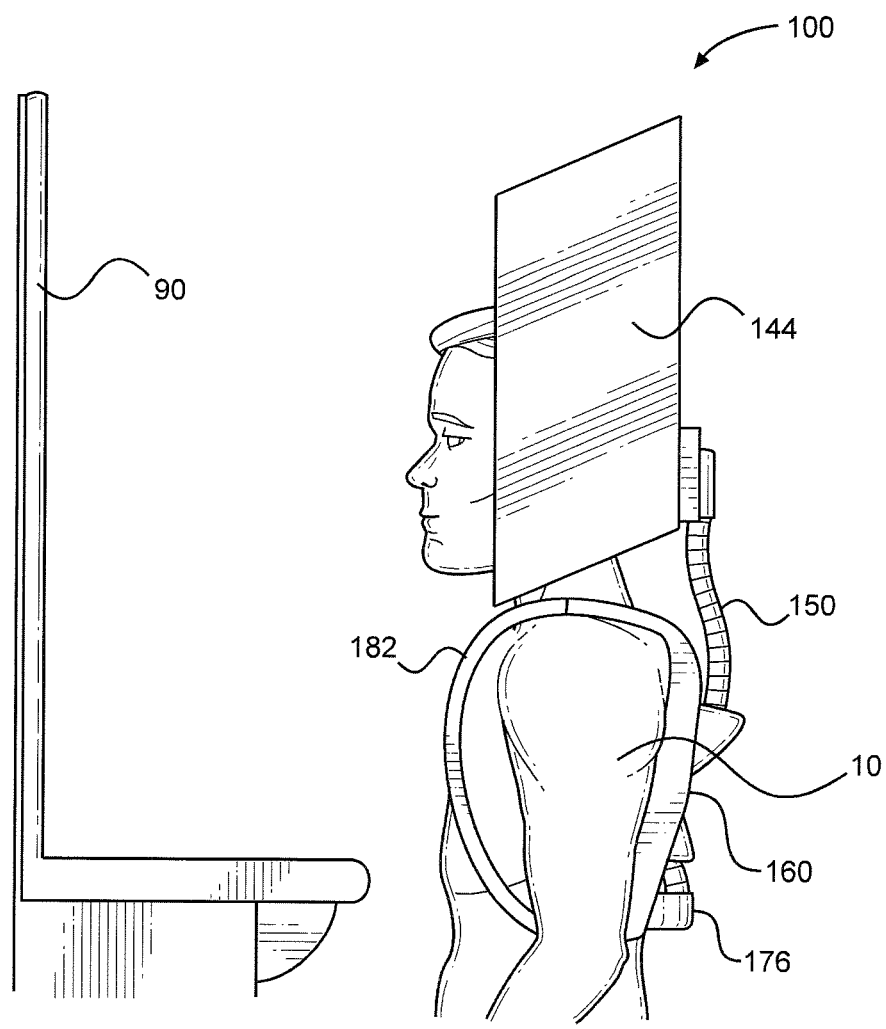
FIG. 11 is a side view of the EZ Mirror in use by a user and showing the user use the EZ Mirror in combination with a bathroom vanity mirror in order to maximize the view of the user's back of head.

Referring next to FIGS. 9 through 11, the EZ Mirror of the present invention is shown in use and is generally designated 100. The EZ Mirror 100 includes the mirror system 110, the conduit 150, and the mirror vest 160. To use the EZ Mirror, first a user 10 connects the first end 152 of the flexible conduit 150 to the central mirror conduit 120 of the mirror system 110 and the second end 154 of the flexible conduit 150 to the mirror vest 160. Next, the user 10 then places the front 164 of the support panel 162 flush against the user's 10 back 60 and then utilizes the left strap 182 and right strap 181 to secure the front 164 of the support panel 162 flush against the user's 10 back 60 by placing the user's 10 left arm 40 through left strap opening 184 and by placing the user's 10 right arm 50 through right strap opening 183 such that the left strap 182 and right strap 181 are secured over the shoulders 70 of the user 10. Once so placed, the mirror system 110 is supported near the head 20 of the user 10 by the flexible conduit 150. A central strap 185 connecting the left strap 182 to the right strap 181 can be used to further ensure that the front 164 of the support panel 162 is held flush on the back 60 of the user 10 and can be tightened using central strap buckle 186. The flexible conduit 150 is then adjusted to ensure that the central mirror panel 120 is located approximately centered on the user's head 20 with the central mirror surface panel 122 facing the rear of the user's 10 head 20. Once so positioned, the EZ Mirror 100 is ready for use.

Once the EZ Mirror 100 is set up and worn by the user 10 as described above, the user 10 has several options to use the EZ Mirror 100. The user 10 may simply glance to the left or right and see his or her side profile reflected in left mirror surface panel 132 or right mirror surface panel 142 respectively. Alternatively, the user 10 can stand facing a conventional mirror 90, such as a bathroom vanity mirror while wearing the EZ Mirror 100. The user 10 can then easily see the back of his or her head 20 reflected in the central mirror surface panel 122. The user 10, when wearing the EZ Mirror 100, is then free to utilize both his or her left hand and right hand to engage in a variety of activities such as cutting or braiding hair.

Figure 12:
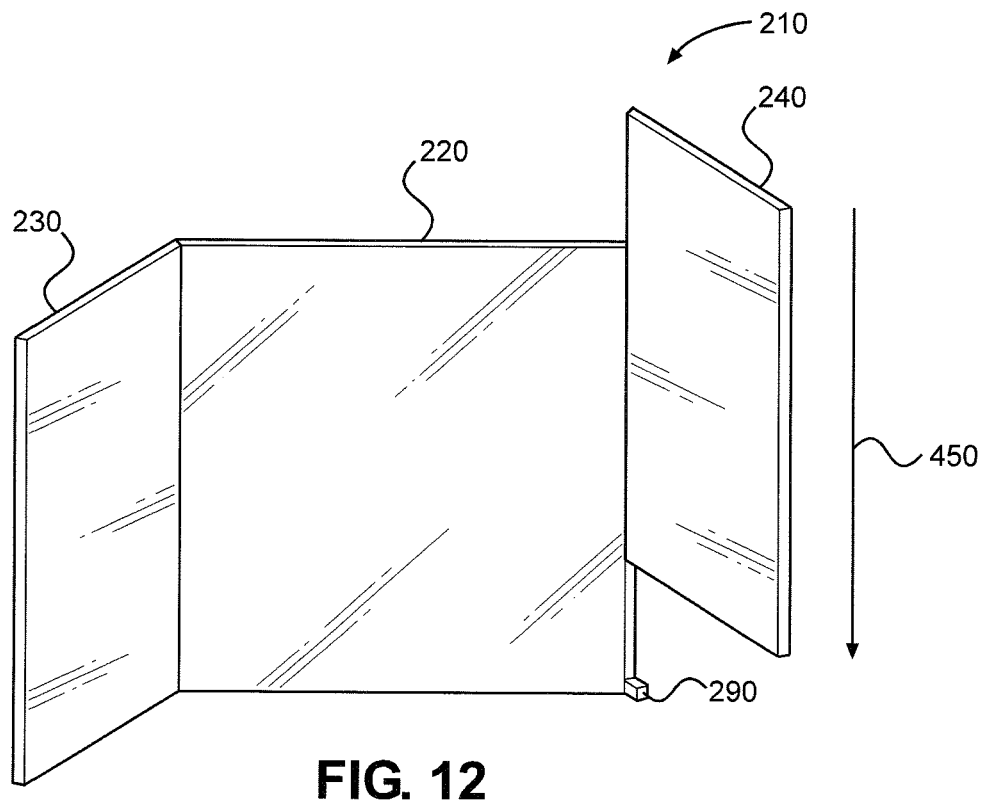
FIG. 12 is a front view of an alternative embodiment of the mirror system of the EZ Mirror showing a right mirror panel removably attached to a central mirror panel.
Figure 13:
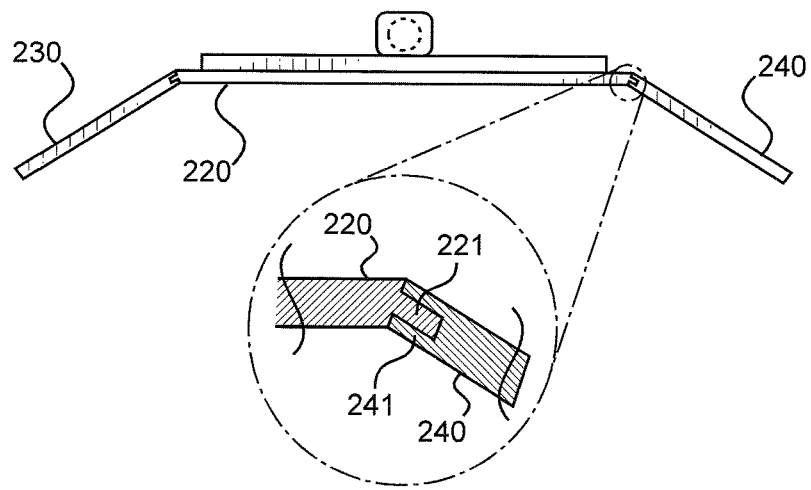
FIG. 13 is a top view of the alternative embodiment of the mirror system of the EZ Mirror shown in FIG. 12 with a close up view showing that the central mirror panel is connected to the right mirror panel via a tongue and groove fitting.

Referring next to FIGS. 12 and 13, an alternative embodiment of mirror system is shown and generally designated 210. In the alternative mirror system 210, the left mirror panel 230 and the right mirror panel 240 are each removably attached to the central mirror panel 220 to enable a user 10 to easily connect and disconnect the left mirror panel 230 and the right mirror panel 240 from the central mirror panel 220. When so disconnected, the left mirror panel 230, right mirror panel 240 and central mirror panel 220 can more easily be stored when not in use. Each side of the central mirror panel 220 is equipped with a tongue 221 along the length of the side and one side of the left mirror panel 230 and right mirror panel 240 are equipped with a corresponding groove 241. As shown in FIGS. 12 and 13, the groove 241 of right mirror panel 240 is slidably inserted onto the tongue 221 of the central mirror panel. Stopper tabs 290 attached to both sides of the central mirror panel 220 ensures that the left mirror panel 230 and the right mirror panel 240 cannot slide past the bottom of the central mirror panel 220.

Figure 14:
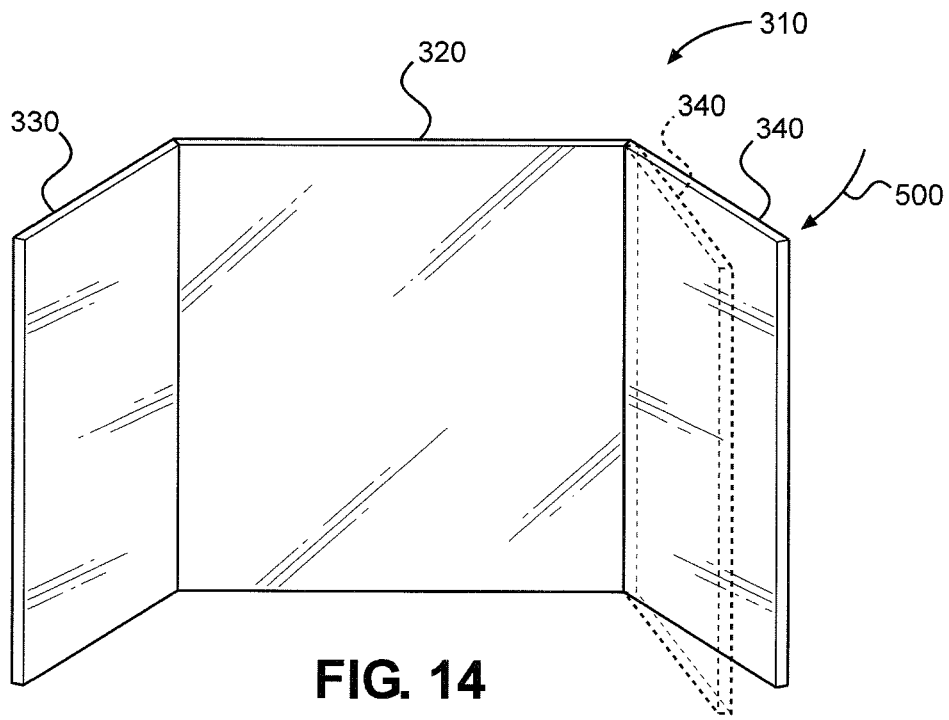
FIG. 14 is a front view of an alternative embodiment of the mirror system of the EZ Mirror showing a right mirror panel rotatably attached to a central mirror panel through use of a hinge.
Figure 15:
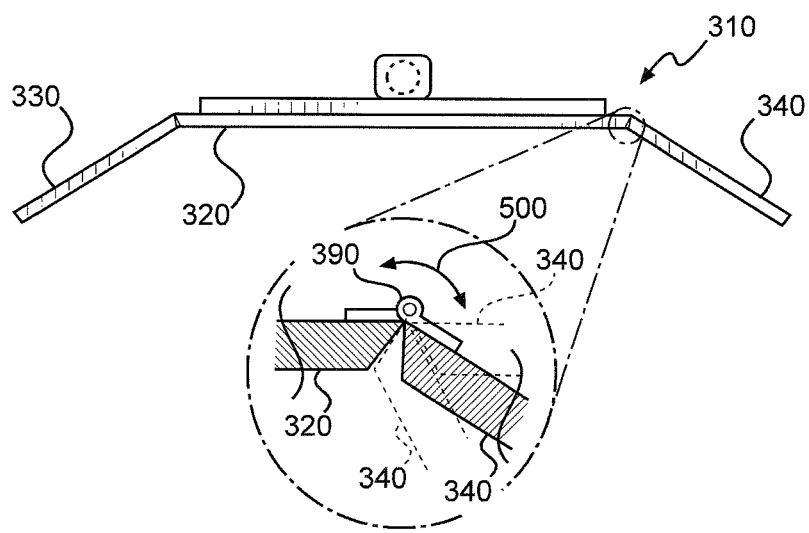
FIG. 15 is a top view of the alternative embodiment of the mirror system of the EZ Mirror shown in FIG. 14 with a close up view showing how the right mirror panel rotates with respect to the central panel about the hinge.

Referring next to FIGS. 14 and 15, an alternative embodiment of mirror system is shown and generally designated 310. In the alternative mirror system 310, the left mirror panel 330 and the right mirror panel 340 are each rotatably connected to the central mirror panel 320 via hinges 390. Any hinge known in the art can be utilized, such as piano hinges that run along the length of each side of central panel 320 and along the length of one side of left mirror panel 330 and right mirror panel 340. As shown, the hinge 390 allows the right mirror panel 340 to rotate in direction 500 about the hinge 390, thus allowing the right mirror panel 340 to be placed at whatever right mirror angle 146 is preferred. A similar hinge 390 on the left mirror panel 330 allows the left mirror angle 136 to be similarly adjusted, although not shown in the figures. Once adjusted, the left mirror panel 330 and the right mirror panel 340 are stationary at their set angles.

Figure 17:
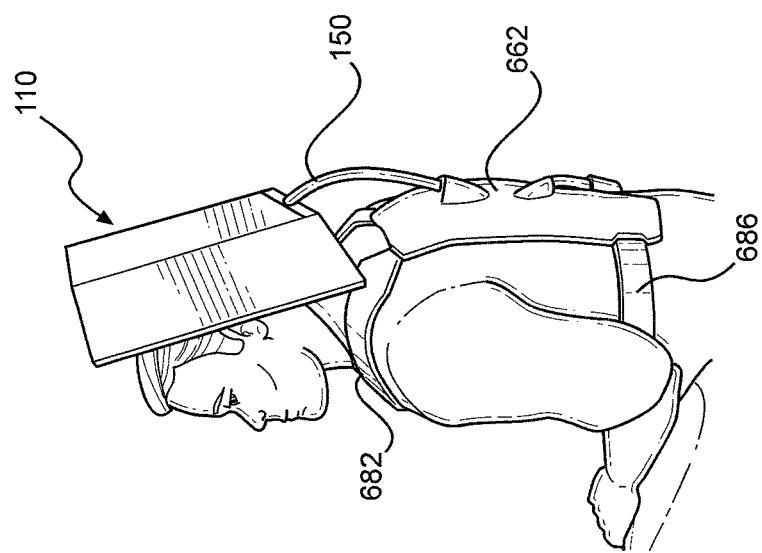
FIG. 17 is a rear perspective view of the EZ Mirror in use by a user and showing the embodiment of the mirror vest depicted in FIG. 16.
Figure 16:
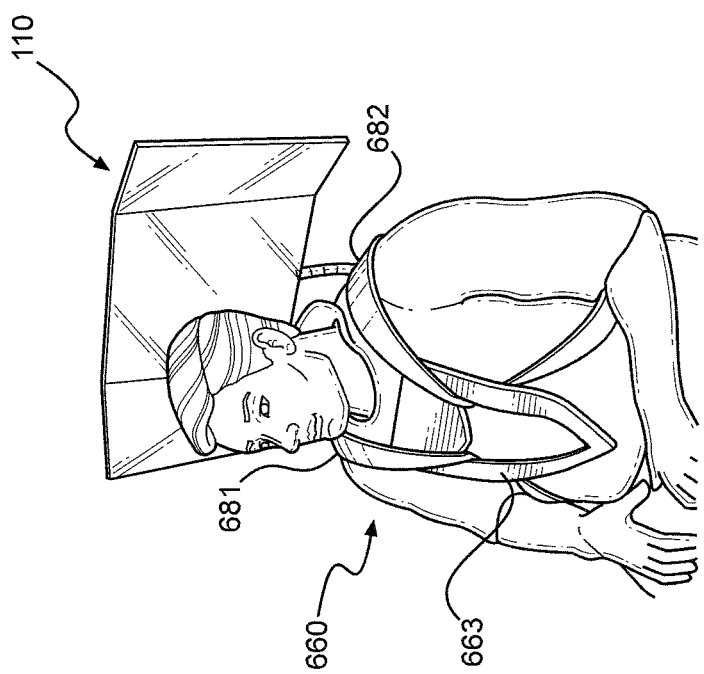
FIG. 16 is a front perspective view of the EZ Mirror in use by a user showing an alternative embodiment of the mirror vest.

Referring next to FIGS. 16 and 17, an alternative embodiment of the mirror vest is shown and generally designated 660. The mirror vest 660 has a support panel 662 on its rear side, which is rigid as in other embodiments, and a rigid front panel 663 on its front side. The rigid front panel 663 is attached to the support panel 662 via a right shoulder strap 681 and a left shoulder strap 682, which connect the top of the support panel 662 to the top of the rigid front panel 663. Near the bottom of the support panel 662 and the rigid front panel 663, a left side strap 686 and a right side strap 687 (not shown) also connect to support panel 662 to the rigid front panel 663. The left side strap 686 and the right side strap 687 are adjustable via sliders, which allow the vest to be loosened for easy placement or removal and tightened for stability while worn. As in other embodiments, a flexible connector or conduit 150 attaches the support panel 662 to the mirror system 110.

Figure 19:
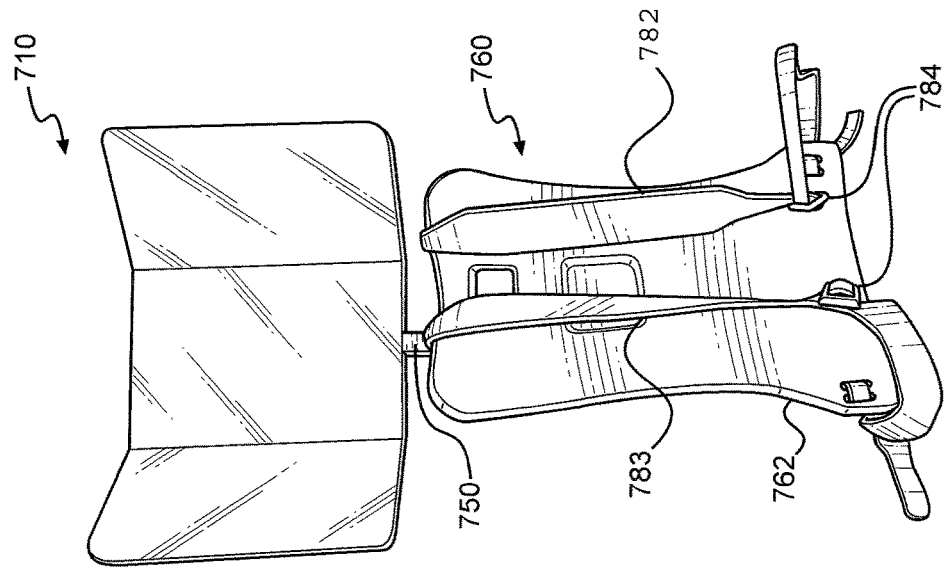
FIG. 19 is a front view of the EZ Mirror showing the embodiment of the vest depicted in FIG. 18.
Figure 18:
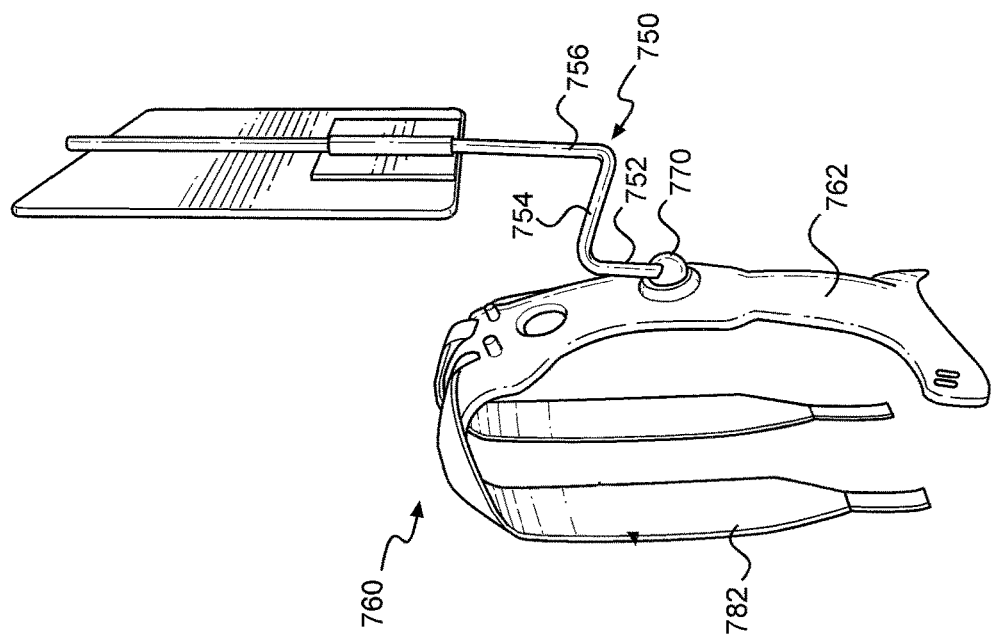
FIG. 18 is a rear perspective view of the EZ Mirror showing an alternative embodiment of the mirror vest and the connector connecting the mirror system to the vest.

Referring next to FIGS. 18 and 19, an alternate embodiment of the EZ Mirror is shown, including a rigid connector 750 which connects the mirror system 710 to the mirror vest 760. The mirror system 710 includes a three-panel mirror substantially similar to the mirror system 110 previously described. Alternatively, the mirror system 710 may be structured according to other three-panel embodiments of the mirror system described above. As can be seen, the rigid connector 750 comprises a lower vertical portion 752 connected to a support panel 762 of the mirror vest 760, a horizontal portion 754 extending out from the vest 760 in order to position the mirror system 710 behind the user's head, and an upper vertical portion 756 connected to the mirror system 710. It will be immediately apparent that other designs would also work effectively for the connector, such as a continuous curvature. In addition to the support panel 762, which rests flush against a user's back, the mirror vest 760 has a left strap 782 and a right strap 783, which are placed around the user's shoulders to allow the vest 760 to be worn. The left strap 782 and the right strap 783 are each adjustable via slides 784, much in the same manner as common backpack straps, in order to secure the vest 760 to the user and provide stability to the mirror system 710.

Figure 20:
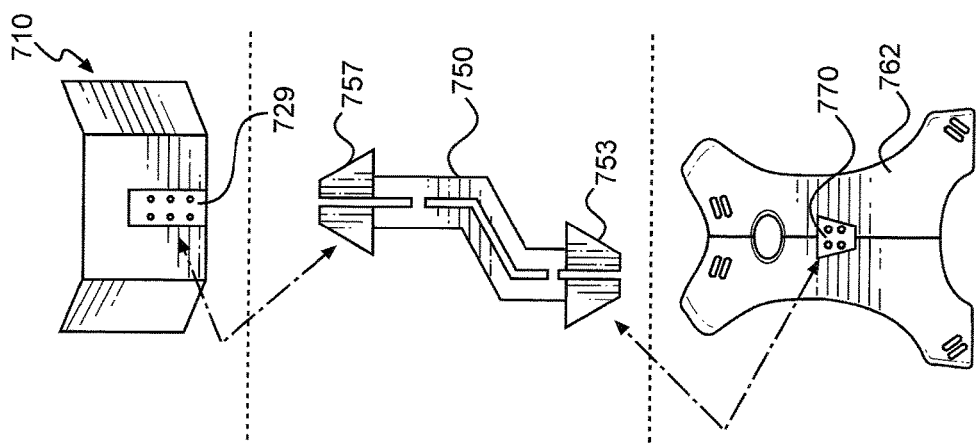
FIG. 20 depicts an attachment mechanism for connecting the mirror system and the mirror vest to the connector.

FIG. 20 shows a mechanism for attaching the mirror system 710 to the mirror vest 760. The rigid connector 750 may be permanently attached to the mirror system 710 and the support panel 762 with, for example, screws or nuts and bolts. However, in an exemplary embodiment, the rigid connector 750 is snapped into place in order to separate the mirror system 710 from the support panel 762 for convenient storage. The rigid connector has snap connectors 753 and 757 on each end, respectively. One end with snap connector 757 is inserted into a connector receiver 729 on the back of the mirror system 710, while the other end with snap connector 753 is inserted into a connector receiver 770 on the back of the support panel 762. The ends of the rigid connector 750 can be removed from the respective receivers by pinching the snap connectors 753 and 757.

Figure 21:
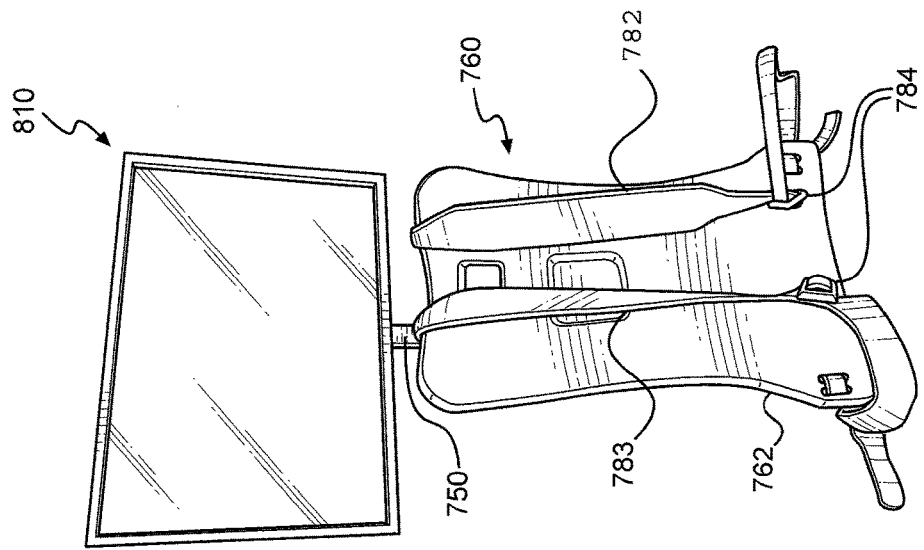
FIG. 21 is a front perspective view of the EZ Mirror showing the embodiment of the vest and the connector shown in FIG. 18 and in use with an alternate embodiment of the mirror system.

Referring now to FIG. 21, a front perspective view of the EZ Mirror is shown with an alternative embodiment of a mirror system 810. The mirror system 810 includes a single-panel mirror. The mirror system 810 is configured to attach to the rigid connector 750, allowing it to be used with embodiments of the mirror vest compatible with the rigid connector 750. As shown, the mirror system 810 is attached to the mirror vest 760 seen in FIG. 18.

Figure 22:
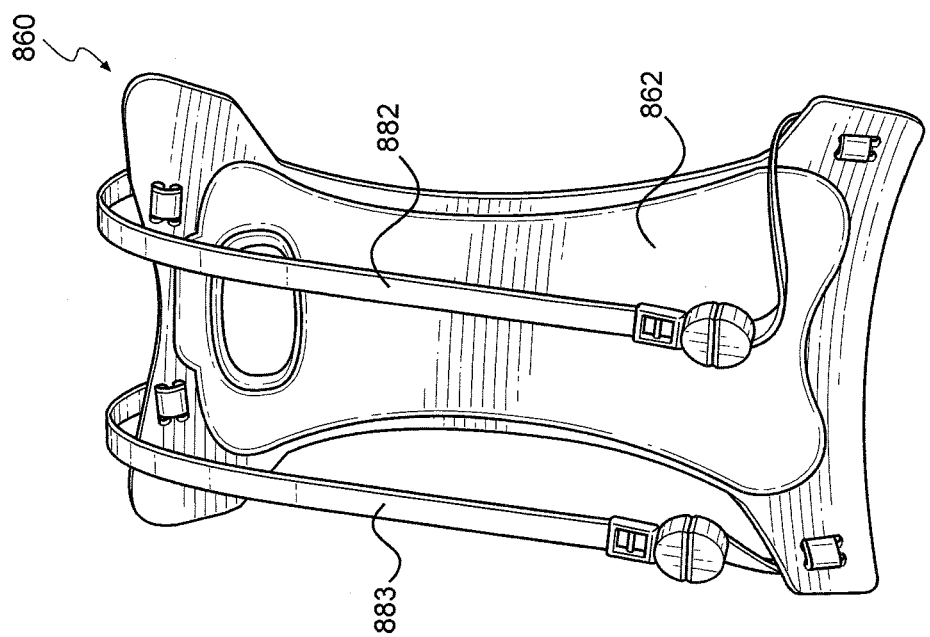
FIG. 22 is a front view of an alternative embodiment of the vest of the EZ Mirror system showing elastic straps.

Referring now to FIG. 22, an alternative embodiment of the mirror vest is shown and generally designated 860. The mirror vest 860 includes a support panel 862 substantially similar to the support panel 762 described above, giving the mirror vest 860 compatibility with the rigid connector 750. Attached to the support panel 862 are a left strap 882 and a right strap 883, both made of a stretchable material such as elastic. By using a stretchable material for the left strap 882 and the right strap 883, a user generally avoids the need to adjust the straps in order to tighten the mirror vest 860 and provide stability to the mirror system.

Figure 23:
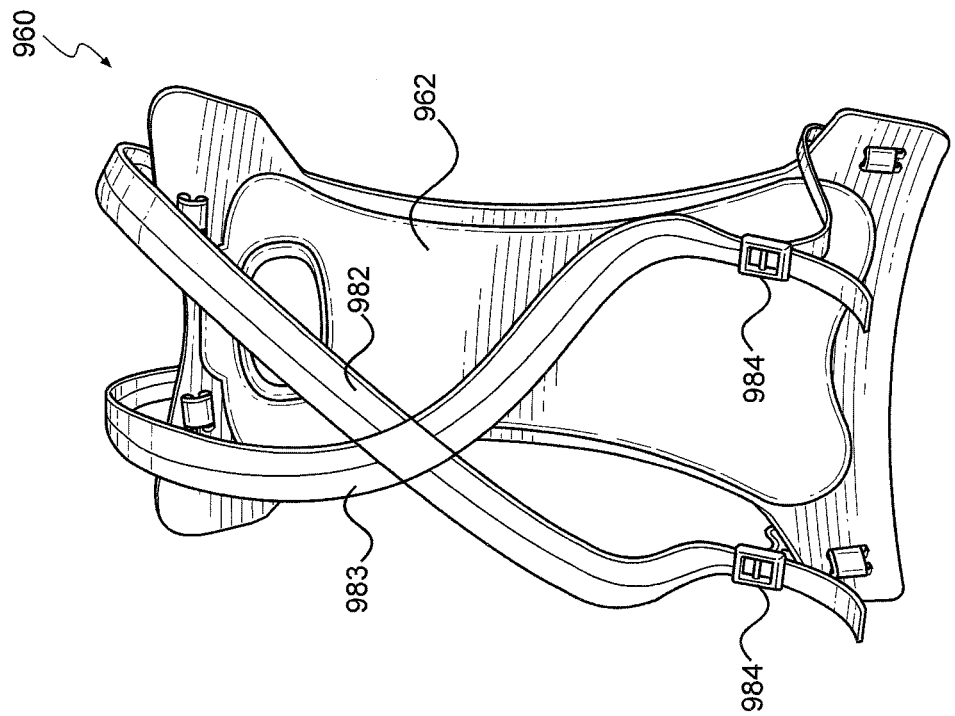
FIG. 23 is a front perspective view of an alternative embodiment of the vest of the EZ Mirror system showing crossed straps.

Referring now to FIG. 23, an alternative embodiment of the mirror vest is shown and generally designated 960. The mirror vest 960 includes a support panel 962 substantially similar to the support panel 762 described above, giving the mirror vest 960 compatibility with the rigid connector 750. Attached to the support panel 962 are a first strap 982 and a second strap 983. The first strap 982 is connected to the top of the support panel 962 proximate the left side from the wearer's perspective. The first strap 982 crosses the second strap 983 and connects to the bottom of the support panel 962 proximate the right side. Likewise, the second strap 983 connects to the top of the support panel 962 proximate the right side, crosses the first strap 982, and connects to the bottom of the support panel 962 proximate the left side. A slide 984 near the bottom of each strap allows the mirror vest 960 to be tightened around the wearer. The crossed straps redistribute the weight of the mirror system, minimizing the formation of torques which would tend to cause undesired rotation of the mirror system. Thus an X-shaped strap system provides stability to the EZ Mirror.

Figure 24:
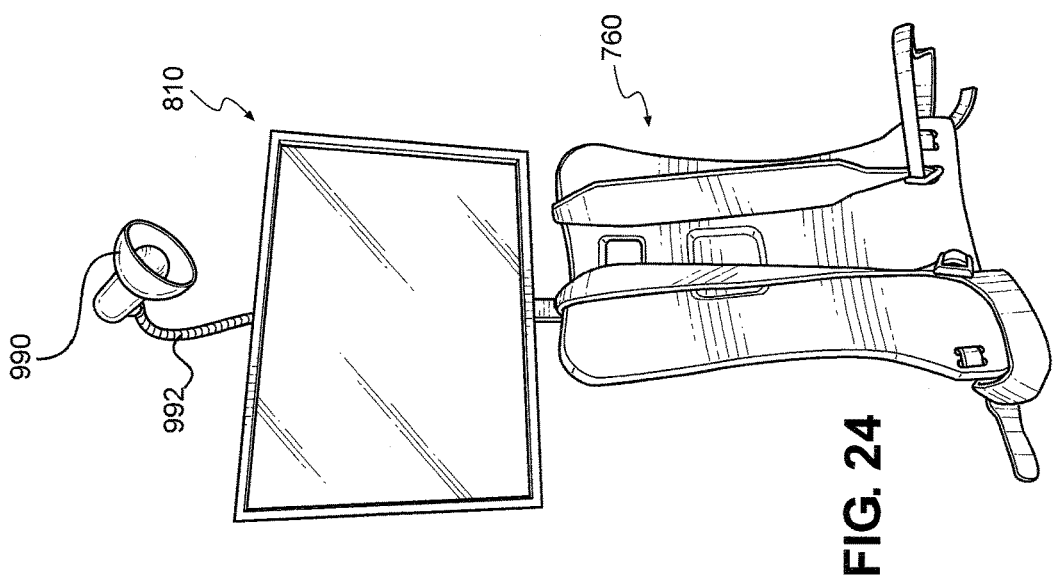
FIG. 24 is a front perspective view of the EZ Mirror showing a lamp attached to the mirror system.

Referring now to FIG. 24, a front perspective view of the EZ Mirror is shown with a lamp 990 attached to the mirror system 810. Although the mirror system 810 from FIG. 21 is shown, the lamp 990 may be attached to any embodiment of the mirror system. The lamp 990 is a battery-operated light, and may include as a light source an incandescent bulb, a compact fluorescent bulb, an LED bulb, or any other light source known in the art. An LED bulb is used in an exemplary embodiment for its low power requirements. A lamp connector 992 attaches the lamp 990 to the mirror system 810, and generally includes a flexible rod or conduit, allowing the lamp to be positioned as desired by the user. Since in a bathroom setting, lights are often placed above the mirror, the lamp 990 allows for better illumination of the back of the user's head.

Figure 25:
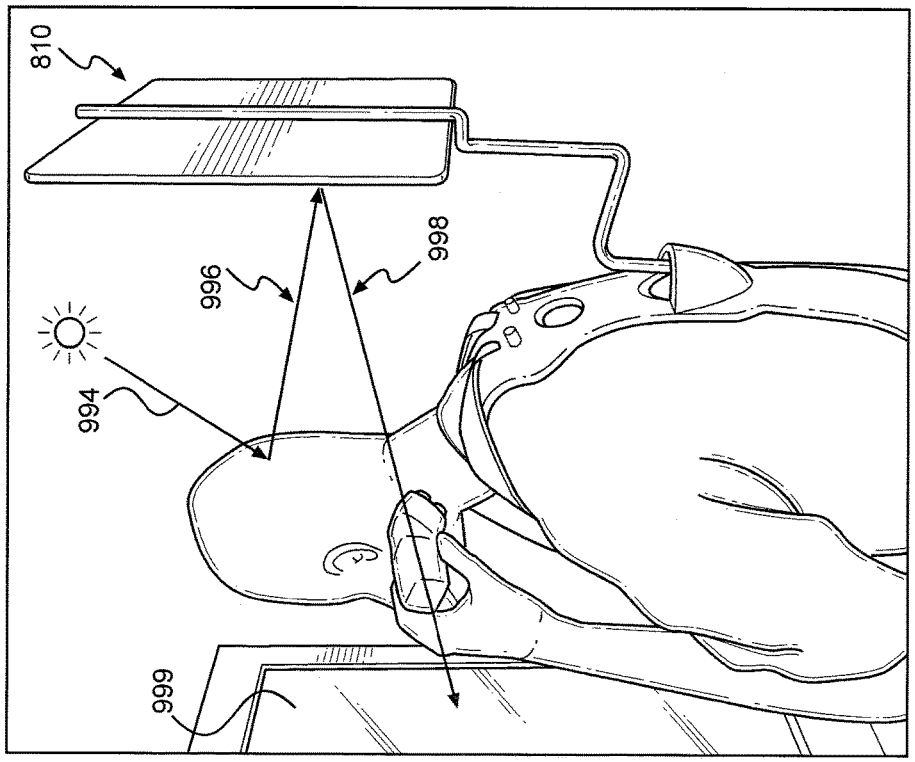
FIG. 25 is a rear perspective view of the EZ Mirror in use by a user and depicting the double reflection which provides a non-reversed image.

Referring now to FIG. 25, the path of light across the EZ Mirror is shown. The mirror system 810 is shown in FIG. 25, but the path of light and reflection is similar with other embodiments of the mirror system. The wavelengths present in ambient light 994 are selectively reflected and absorbed by the object it hits, resulting in a visible image 996. As light forming a visible image 996 hits the mirror of the mirror system 810, it is reflected and forms a reflected image 998 wherein the reflected image 998 is identical to the visible image 996 except for a reversal between the left and right sides. When the reflected image 998 hits another mirror, such as a bathroom wall mirror 999, it is reflected once again, resulting in a second reversal between the left and right sides, making it identical to the visible image 996. Thus, the image seen in the wall mirror 999 is non-reversed. Since the image is non-reversed, the user sees movements in their natural directions, making tasks such as cutting hair easier.

Referring now to FIG. 26, an alternative embodiment of the mirror vest is shown and generally designated 1060. The mirror vest 1060 includes a left strap 1082 and a right strap 1083. Although a variety of materials are suitable for making the left strap 1082 and the right strap 1083, a stretchy elastic material is generally used. The elastic material allows for the mirror vest 1060 to be worn by a user without needing to adjust the straps in order for the support panel 1062 to be held flush against the user's back. A rigid connector 1050 connects the mirror vest 1060 to a mirror system. The rigid connector 1050 includes a lower vertical portion (not visible in FIG. 26), an angled portion 1054 which extends outward from the mirror vest 1060, and an upper vertical portion 1056 connected to the mirror system. A clip connector 1057 at the end of the upper vertical portion 1056 is substantially broader than the connector 1050, allowing for a firm and stable grasp onto the mirror system. A slide button 1059 engages and disengages the clip connector 1057 in order to secure the connector 1050 to a mirror system.

While there have been shown what are presently considered to be preferred embodiments of the present invention, it will be apparent to those skilled in the art that various changes and modifications can be made herein without departing from the scope and spirit of the invention.

What is claimed is:

1. A wearable mirror system comprising:
a mirror system comprising at least one mirror panel;
a harness configured to be worn by a user and comprising a support panel configured to be worn against a back of said user;
a flexible connector connecting said mirror system to said support panel of said harness; wherein said flexible connector allows adjustment to address different heights and thicknesses of various users and is sufficiently strong to bear the weight of said mirror system once flexed into a specific user's desired position;
wherein said mirror system further comprises:
a central mirror panel;
a left mirror panel connected to said central mirror panel at a left mirror angle with respect to said central mirror panel;
a right mirror panel connected to said central mirror panel at a right mirror angle with respect to said central mirror panel, said left mirror panel and said right mirror panel are removably attached to said central mirror panel
wherein said central mirror panel further comprises:
a left edge,
a right edge,
a left tongue along said left edge,
a left stopper tab at a bottom end of said left edge,
a right tongue along said right edge, and
a right stopper tab at a bottom of said right edge;
wherein said left mirror panel comprises a groove configured to be received by said left tongue of said central mirror panel and to sit upon said left stopper tab; and
wherein said right mirror panel comprises a groove configured to be received by said right tongue of said central mirror panel and to sit upon said right stopper tab.

2. A wearable mirror system comprising:
a mirror system comprising at least one mirror panel;
a harness configured to be worn by a user and comprising a support panel configured to be worn against a back of said user; and
a flexible connector connecting said mirror system to said support panel of said harness,
wherein said flexible connector allows adjustment to address different heights and thicknesses of various users and is sufficiently strong to bear the weight of said mirror system once flexed into a specific user's desired position;
wherein said support panel further comprises an upper-left portion, an upper-right portion, a left side, and a right side; and wherein said harness further comprises:
a rigid front panel comprising an upper-left portion, an upper-right portion, a left side, and a right side, said rigid front panel configured to be worn against the chest of said user;
a left shoulder strap connecting the upper-left portion of said support panel to the upper-left portion of said rigid front panel;
a right shoulder strap connecting the upper-right portion of said support panel to the upper-right portion of said rigid front panel;
a left side strap configured to connect the left side of said support panel to the left side of said rigid front panel below said user's left arm; and
a right side strap configured to connect the right side of said support panel to the right side of said rigid front panel below said user's left arm.

3. The wearable mirror system as recited in claim 2, wherein said left shoulder strap is adjustable and said right shoulder strap is adjustable.

4. The wearable mirror system as recited in claim 2, wherein said left shoulder strap comprises an elastic material and said right shoulder strap comprises an elastic material.

* * * * *